United States Patent
Goldman (10) Patent No.: US 11,884,417 B2
(45) Date of Patent: Jan. 30, 2024

(54) EMERGENCY FLIGHT DIRECTOR

(71) Applicant: Rockwell Collins, Inc., Cedar Rapids, IA (US)

(72) Inventor: Daniel B. Goldman, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 212 days.

(21) Appl. No.: 16/907,856

(22) Filed: Jun. 22, 2020

(65) Prior Publication Data

US 2021/0394922 A1    Dec. 23, 2021

(51) Int. Cl.
| | |
|---|---|
| *B64D 45/04* | (2006.01) |
| *B64D 45/00* | (2006.01) |
| *G08G 5/00* | (2006.01) |
| *G08G 5/02* | (2006.01) |

(52) U.S. Cl.
CPC ......... *B64D 45/04* (2013.01); *B64D 45/0059* (2019.08); *G08G 5/0013* (2013.01); *G08G 5/0021* (2013.01); *G08G 5/0039* (2013.01); *G08G 5/025* (2013.01); *B64D 2045/0085* (2013.01)

(58) Field of Classification Search
CPC ...................................................... B64D 45/04
See application file for complete search history.

(56) References Cited

U.S. PATENT DOCUMENTS

| | | | |
|---|---|---|---|
| 8,180,503 B2 | 5/2012 | Estabrook et al. | |
| 8,504,222 B2 | 8/2013 | Braly et al. | |
| 8,862,290 B1 * | 10/2014 | Ali | B64D 45/04 |
| | | | 701/16 |
| 9,043,043 B1 | 5/2015 | Gribble et al. | |
| 9,199,724 B2 | 12/2015 | Pastor | |
| 10,114,381 B2 * | 10/2018 | Haskins | G08G 5/02 |
| 10,620,641 B2 | 4/2020 | Haskins et al. | |
| 2007/0050100 A1 | 3/2007 | Gustafson et al. | |
| 2008/0039922 A1 * | 2/2008 | Miles | A61B 17/12172 |
| | | | 623/23.76 |

(Continued)

FOREIGN PATENT DOCUMENTS

| | | | | |
|---|---|---|---|---|
| CN | 110194274 A | * | 9/2019 | ............. B60K 35/00 |
| EP | 3879511 A1 | * | 9/2021 | ............. B64C 13/16 |
| WO | WO-2020014753 A1 | * | 1/2020 | ............. G01C 21/20 |

OTHER PUBLICATIONS

Extended Search Report for European Application No. 21180919.9 dated Nov. 23, 2021, 8 pages.

*Primary Examiner* — Jean Paul Cass
(74) *Attorney, Agent, or Firm* — Suiter Swantz llo (57) ABSTRACT

A system and method for emergency manual flight direction to a non-pilot enables the non-pilot an ability to safely land an aircraft after an event causing a single pilot of the aircraft to become unable to perform pilot tasks. The emergency flight director (EFD) receives inputs from a plurality of sources and displays information, maneuver, configuration and communication commands to the non-pilot on a flight deck display. Inputs to the system include aircraft state data as well as airport and current weather information associated with each available airport. The EFD determines an appropriate emergency landing runway and presents simplified commands coupled with animated aircraft specific graphics to the non-pilot to manually fly the aircraft to a safe landing.

13 Claims, 11 Drawing Sheets

(56) References Cited

U.S. PATENT DOCUMENTS

| | | | |
|---|---|---|---|
| 2008/0039988 A1* | 2/2008 | Estabrook | G08G 5/0013 701/14 |
| 2010/0305786 A1* | 12/2010 | Boorman | G08G 5/0021 701/16 |
| 2014/0316617 A1 | 10/2014 | Ali | |
| 2014/0324255 A1 | 10/2014 | Siddiqi et al. | |
| 2016/0104384 A1* | 4/2016 | Hanel | G01C 21/005 701/17 |
| 2016/0245666 A1 | 8/2016 | McQuillan et al. | |
| 2017/0038223 A1* | 2/2017 | Toumazet | B64D 45/00 |
| 2017/0283038 A1 | 10/2017 | Lin | |
| 2018/0134410 A1 | 5/2018 | Fymat | |
| 2018/0364707 A1 | 12/2018 | Bosworth et al. | |
| 2020/0172264 A1* | 6/2020 | Das | G08G 5/02 |

\* cited by examiner

EMERGENCY FLIGHT DIRECTOR

BACKGROUND

Many aircraft are configured to be flown by a single pilot. Also, many aircraft are not fitted with an autopilot. While it is unlikely for a pilot of the single piloted aircraft to become incapacitated in flight, such event in an aircraft without an operational autopilot may have dire consequences. While known instances of an incapacitation event causing an incident may be rare, non-pilots, oversight agencies, and insurance carriers may maintain an interest in safety of passengers and crew.

At present, autopilot commanded autoland technology may be prevalent, however a non-autopilot option may maintain particular value to assist those non-pilots onboard aircraft without installed and operational autopilot or instrument landing systems.

Therefore, a need remains for a system and related method which may overcome these limitations and provide a novel solution to assisting a non-pilot in manual flight with no autopilot to safely land an aircraft.

SUMMARY

In one aspect, embodiments of the inventive concepts disclosed herein are directed to a system for emergency manual flight direction to a non-pilot. The system may comprise a flight deck display onboard an aircraft and a flight deck interface onboard the aircraft.

To enable connectivity with the aircraft status, an aircraft status link onboard the aircraft may be configured to communicate an aircraft status including an airspeed, an altitude, a heading, an attitude, a position, and a fuel state associated with the aircraft. For communication external to the aircraft, the system may include an aircraft communication link onboard the aircraft.

For system control, a controller onboard the aircraft may be operatively coupled with a tangible, non-transitory memory onboard the aircraft configured to communicate with the controller. The tangible, non-transitory memory may include a list of emergency airports as well as instructions stored therein that, in response to execution by the controller, cause the controller to carry out each function of the system.

The controller may be configured to receive, from the flight deck interface, an indication of a user command to enter an emergency flight mode and receive a current aircraft status from the aircraft status link. Once the aircraft status is received, the controller may determine at least one probable emergency landing airport based on the current aircraft status and the list of emergency airports and determine an appropriate emergency landing runway based on the aircraft status and a weather condition at each of the at least one probable emergency landing airports.

The controller may determine a desired aircraft status to position the aircraft on a path to landing at the appropriate emergency landing runway and display, on the flight deck display, an information dialog, a maneuver command, a configuration command, and a communication command. Here, each of the information dialog, the maneuver command, the configuration command, and the communication command may be configured for 1) interpretation by a non-pilot of the aircraft for manual flight of the aircraft, 2) achieving the desired aircraft status, and 3) assisting the non-pilot in maintaining the path to landing at the appropriate emergency landing runway. During the emergency mode, the controller may further update each of the information dialog, the maneuver command, the configuration command, and the communication command based on a change in the aircraft status.

A further embodiment of the inventive concepts disclosed herein may include a method for emergency manual flight direction to a non-pilot. The method may comprise receiving, from a flight deck interface onboard an aircraft, an indication of a user command to enter an emergency flight mode and receiving a current aircraft status from an aircraft status link, the current aircraft status including at least an airspeed, an altitude, a heading, an attitude, a position, and a fuel state associated with the aircraft.

The method may include comparing the position associated with the aircraft with a position of a probable emergency landing airport and determining an appropriate emergency landing runway based on the comparison, the current aircraft status, and a weather condition at each of the probable emergency landing airport.

The method may also include determining a desired aircraft status to position the aircraft on a path to landing at the appropriate emergency landing runway, the desired aircraft status including each of the airspeed, the altitude, the heading, the attitude, and the position associated with the aircraft and displaying, on a flight deck display onboard the aircraft, an information dialog, a maneuver command, a configuration command, and a communication command to the non-pilot. Here as well, each of the information dialog, the maneuver command, the configuration command, and the communication command configured for 1) interpretation by the non-pilot of the aircraft for a manual flight of the aircraft, 2) achieving the desired aircraft status, and 3) assisting the non-pilot in maintaining the path to landing at the appropriate emergency landing runway airport. Further, the method may include updating each of the maneuver command, the configuration command, and the communication command based on a change in the aircraft status.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for emergency manual flight direction to a non-pilot which enables the non-pilot an ability to safely land an aircraft after an event causing a single pilot of the aircraft to become unable to perform pilot tasks. The emergency flight director (EFD) receives inputs from a plurality of sources and displays information, maneuver, configuration and communication commands to the non-pilot on a flight deck display. Inputs to the system include aircraft state data as well as airport and current weather information associated with each available airport. The EFD determines an appropriate emergency landing runway and presents simplified commands coupled with animated aircraft specific graphics to the non-pilot to manually fly the aircraft to a safe landing

| REFERENCE CHART | |
|---|---|
| 100 | Emergency Flight Director (EFD) System |
| 102 | Aircraft |
| 110 | Display |
| 112 | Emergency Flight Mode Button |
| 114 | Touchscreen Interface |
| 120 | Controller |
| 122 | Memory |
| 124 | Non-Pilot Commands |
| 130 | Aircraft Status Link |
| 140 | Communication Link |
| 150 | Navigation Link |
| 200 | Timeline Diagram |
| 202 | Emergency Event/EFD Activation |
| 204 | EFD Descent Phase |
| 206 | EFD Approach Phase |
| 208 | EFD Landing Phase |
| 210 | EFD Touchdown Phase |
| 220 | Appropriate Emergency Landing Runway |
| 230 | Probable Emergency Landing Airport |
| 300 | EFD Mode Entry Diagram |
| 310 | Primary Flight Display (PFD) |
| 320 | EFD Command Display |
| 322 | Information Dialogs |
| 324 | Maneuver Commands |
| 326 | Configuration Commands |
| 328 | Communication Commands |
| 330 | Graphic Presentation |
| 400 | EFD Commands Diagram |
| 410 | Multi-Function Display |
| 500 | Frequency Presentation |
| 600 | EFD Airspeed Change |

-continued

REFERENCE CHART

| | |
|---|---|
| 700 | EFD Power Change |
| 800 | EFD Flaps Change |
| 900 | EFD Wheels Change |
| 1000 | EFD Landing Command |
| 1100 | Method Flow |

Figure 1:
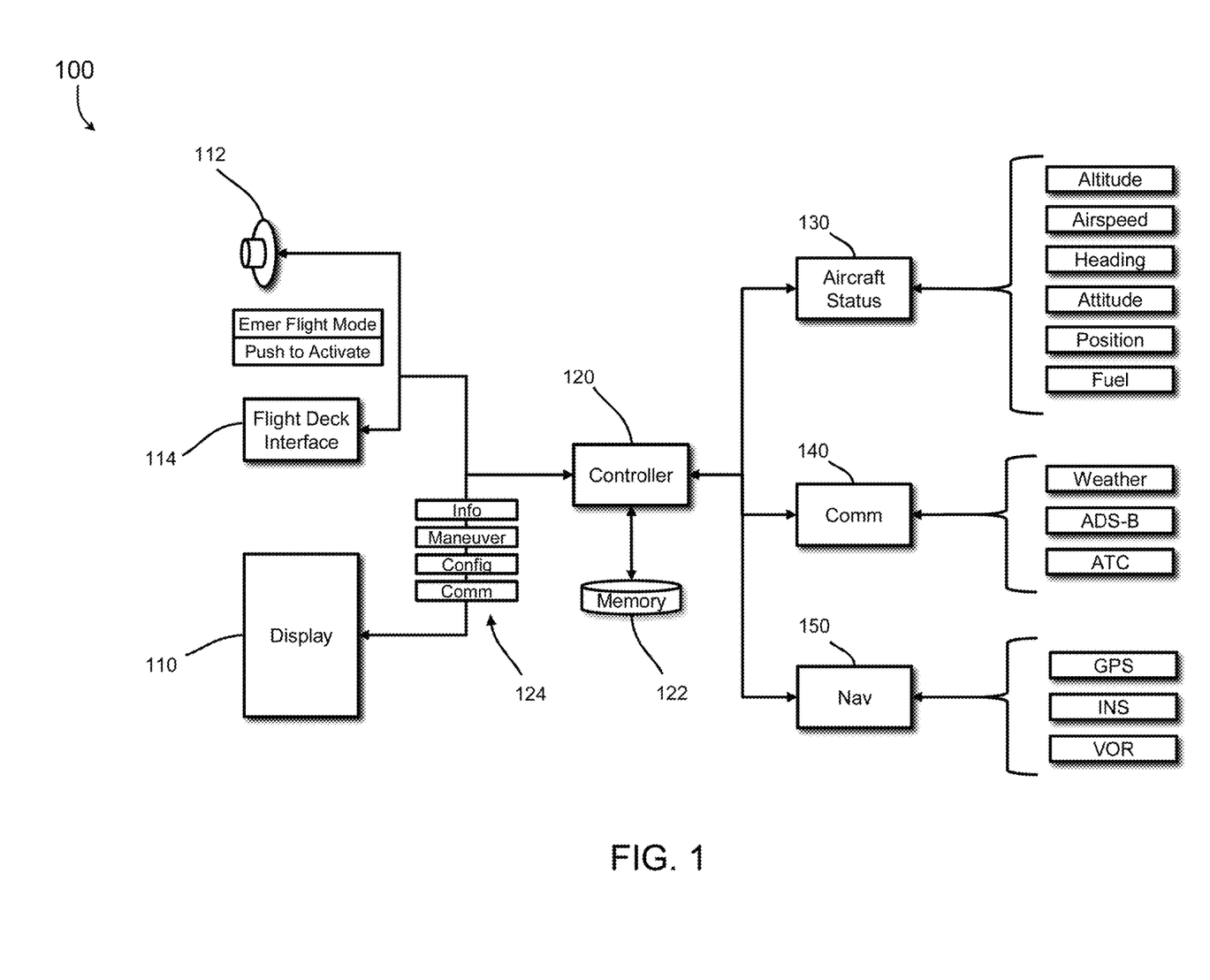
FIG. 1 is a diagram of a system for emergency manual flight direction to a non-pilot in accordance with an embodiment of the inventive concepts disclosed herein.

FIG. 1 System

Referring to FIG. 1, a diagram of a system for emergency manual flight direction to a non-pilot in accordance with an embodiment of the inventive concepts disclosed herein is shown. Generally, an Emergency Flight Director (EFD) system 100 may include hardware within an aircraft flight deck as well as connectivity to a plurality of aircraft state parameters and external data to, upon activation, guide a non-pilot in manual flight to a descent and landing at a suitable airport.

The EFD system 100 may reside within the aircraft for which it is applicable. For simplicity of operation and limits on cost, external operational data link connectivity for maneuvering commands may be create unnecessary complexity, weight, and cost. Also, the EFD system 100 may be specifically configured for implementation within a no auto-pilot aircraft. In this manner, the system generates and displays specific commands to the non-pilot based on aircraft state information with detailed direction to manually fly an aircraft 102.

The Emergency Flight Director (EFD) System 100 may include an aircraft display 110 configured normally for displaying detailed information to the single pilot of the aircraft. In a standby mode of the EFD system 100, the display 110 may function normally indicating the various parameters to the pilot. The display may include any display type able to receive information from a flight management system (FMS) and display the information to the pilot. In one embodiment, the EFD system 100 may employ the display 110 to include a primary flight display (PFD) and a multi-function display (MFD) within the flight deck. Once the EFD system 100 may be activated to an emergency mode, the display may present additional information available to the non-pilot for aid in landing the aircraft 102.

The EFD system 100 may further include a flight deck interface onboard the aircraft to enable a non-pilot to easily activate the emergency mode of the EFD system 100. In one embodiment, the flight deck interface may include an emergency flight mode button or guarded switch 112 and touchscreen flight deck interface 114 to enable immediate activation of the emergency mode.

For EFD system 100 connectivity to the systems onboard the aircraft 102, an aircraft status link 130 onboard the aircraft may be configured to communicate an aircraft status including a non-limiting list of an airspeed, an altitude, a heading, a three-axis attitude (e.g., pitch, roll, yaw), a position, and a fuel state associated with the aircraft.

To enable communication external to the aircraft 102, the EFD system 100 may include a communication link 140 including a data connectivity ability to receive weather information, additional information (including weather data) via an Automatic Dependent Surveillance Broadcast (ADS-B) system, and voice communication with entities external to the aircraft (e.g., Air Traffic Control (ATC), other proximal aircraft).

In one embodiment of the inventive concepts disclosed herein, the EFD system 100 may also include a navigation link 150 configured to supply a navigation solution to the EFD system. Some exemplary navigation sources may include a Global Positioning System (GPS) or Global Navigation Satellite System (GNSS), an Inertial Navigation System (INS) and a VHF Omnidirectional Range (VOR) system.

To maintain function the EFD system 100, a controller 120 onboard the aircraft coupled with a memory 122 may provide system function. In embodiments, the controller 120 may include a Flight Management Computer (FMC) or Mission Computer (MC) and the like to process commands and provide desired elements based on a plurality of variable inputs. The memory 122 may include a navigation data base (NAV DB) as well a position-based data for air navigation and communication. For example, the memory 122 may include an altitude-based frequency for ATC and information associated with each airport within the NAV DB.

The memory 122 may include a tangible, non-transitory memory onboard the aircraft configured to communicate with the controller 120, the tangible, non-transitory memory 122 including a list of emergency airports and associated details about those airports within the NAV DB. For example, the airport detail may include runway length and orientation, ATC frequencies for approach and tower control. In addition, upon aircraft power up, the EFD system 100 may query an external network via the communications link 140 to update airport status including a current weather status associated with each emergency airport along, for example, an expected route.

In one embodiment of the inventive concepts disclosed herein, the tangible, non-transitory memory may have instructions stored therein that, in response to execution by the controller 120, may cause the controller 120 to carry out each function of the EFD system 100. One function of the controller 120 may include generation and display of a plurality of non-pilot commands 124 easily recognizable and designed to be interpreted by the non-pilot.

Figure 2:
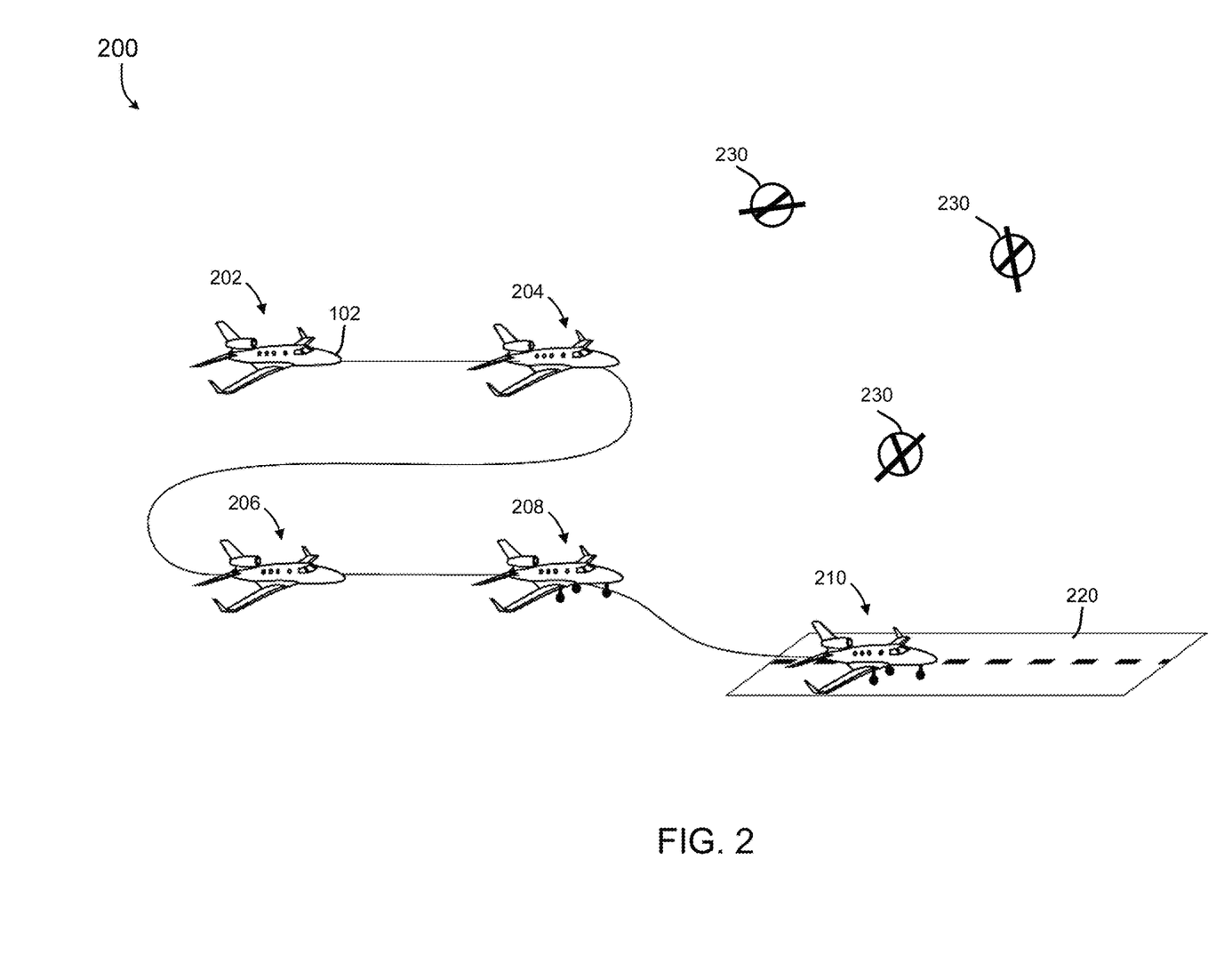
FIG. 2 is a diagram of a timeline of events in accordance with an embodiment of the inventive concepts disclosed herein.

FIG. 2 Sequence

Referring now to FIG. 2, a diagram of a timeline of events in accordance with an embodiment of the inventive concepts disclosed herein is shown. A timeline diagram 200 may indicate each phase of the aircraft 102 as it may progress from an emergency event EFD activation 202 through each of an EFD descent phase 204, an EFD approach phase 206, an EFD landing phase 208, and an EFD touchdown phase 210 at an appropriate emergency landing runway 220. A probable emergency landing airport 240 may include those airfields within range of the aircraft 102 and current fuel state.

Figure 3:
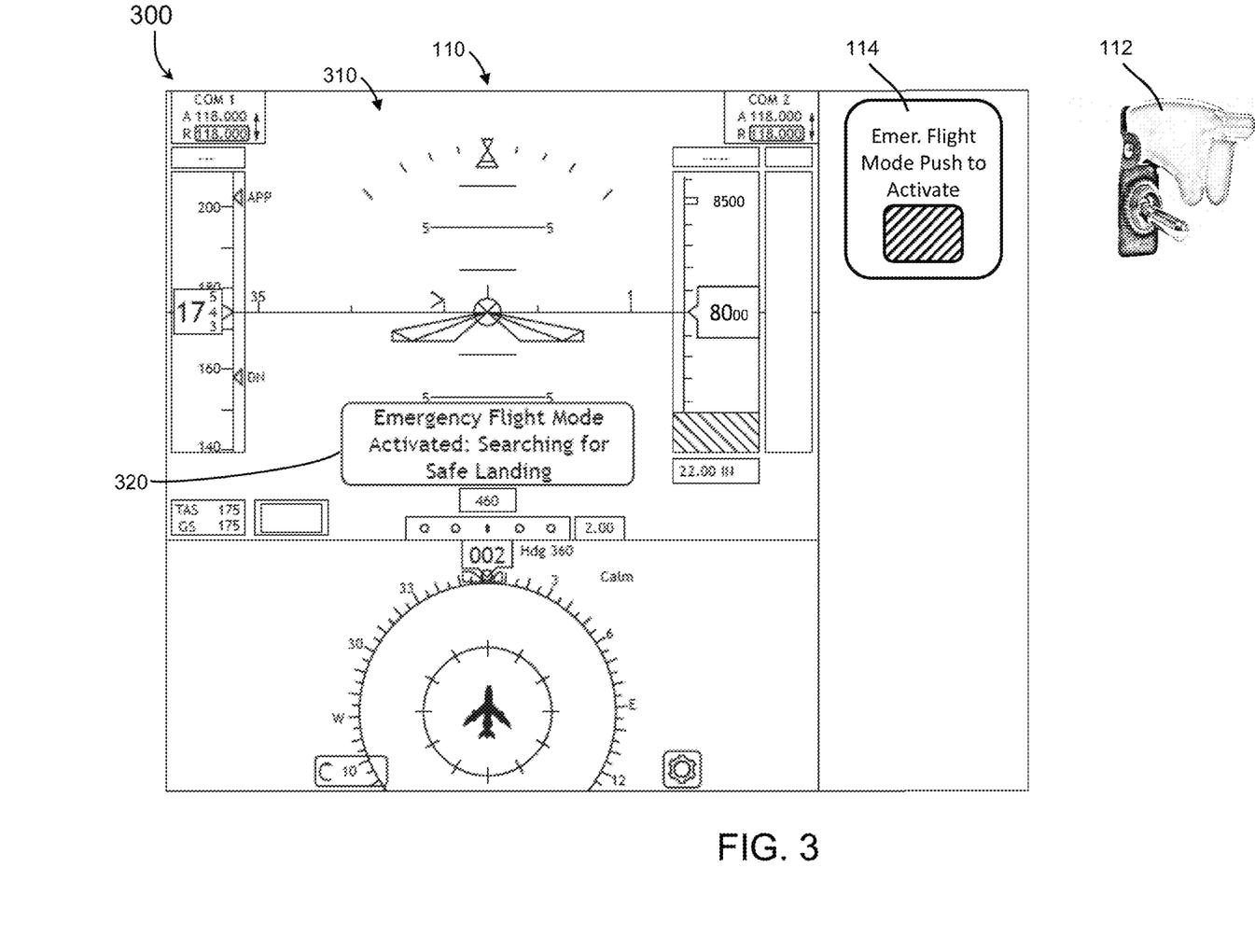
FIG. 3 is a diagram of EFD mode flight deck interface exemplary of an embodiment of the inventive concepts disclosed herein.

FIG. 3 Mode Activation

Referring now to FIG. 3, a diagram of EFD mode flight deck interface exemplary of an embodiment of the inventive concepts disclosed herein is shown. The controller 120 may receive, from the flight deck interface, an indication of a user command to enter the emergency flight mode. An EFD mode entry diagram 300 may indicate an exemplary flight deck interface or method of entry of the EFD system 100 from the standby mode to the emergency mode. In embodiments, the non-pilot may enter the emergency mode of the EFD system 100 via a touchscreen interface which may display a guarded or unguarded touchscreen selection presentation. Alternatively, the emergency flight mode button 112 may include a guarded switch clearly marked for ease of recognition by the non-pilot. In some embodiments, a simple button may offer an ease of entry into the emergency flight mode.

In one embodiment of the inventive concepts disclosed herein, should the pilot inadvertently enter the emergency flight mode the EFD system 100 may include a sequence of user inputs to exit the emergency flight mode. For example, a mere deselection of a switch or a more complex sequence may allow exit from the emergency flight mode of the EFD system 100. As the EFD system 100 in the emergency flight mode may become vital to the non-pilot, a difficult exit from the emergency flight mode may be a desirous option.

Here, a primary flight display (PFD) 310 may offer one alternative for the non-pilot to select the emergency mode of the EFD system 100. An EFD command display 320 may provide a centrally located window of view for the non-pilot to easily recognize a change in the mode of the PFD 310.

Once the emergency mode of the EFD system 100 is active, the controller 120 may receive a current aircraft status from the aircraft status link 130 and begin to determine a probable emergency landing airport based on the current aircraft status and the list of emergency airports. Once the controller 120 may compare the list to the current aircraft status, including a fuel on board, range to each airport, and weather at each airport, the controller 120 may determine an appropriate emergency landing runway based on the aircraft status and a weather condition at each of the at least one probable emergency landing airports.

Figure 4:
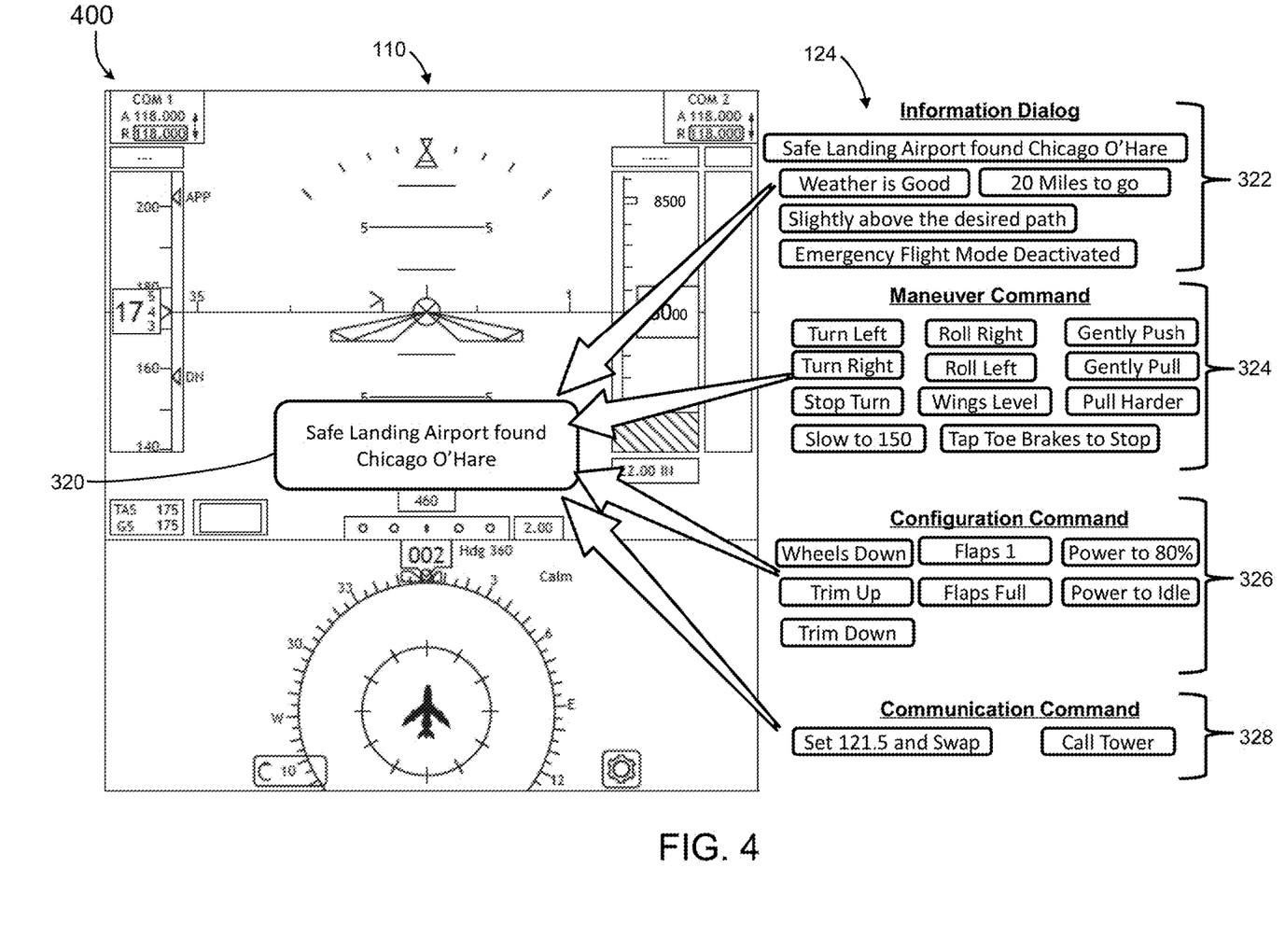
FIG. 4 is a diagram of exemplary EFD commands exemplary of one embodiment of the inventive concepts disclosed herein.

FIG. 4 Commands

Referring now to FIG. 4, a diagram of exemplary EFD commands exemplary of one embodiment of the inventive concepts disclosed herein is shown. An EFD commands diagram 400 may include an exemplary plurality of non-pilot commands 124 presented to the non-pilot to assist in landing the aircraft 102. In one embodiment of the inventive concepts disclosed herein, the controller 120 may determine a desired aircraft status to position the aircraft on a path to landing at the appropriate emergency landing runway and display, on the flight deck display 110, the plurality of non-pilot commands 124 within the desired display 110. In embodiments, the desired aircraft status may include speed, altitude, three-axis attitude, and heading.

A nearest airport may be one option for the controller 120 to select. However, based on current weather received via the ADS-B network via the communications link 140 and available runway length at each of the airports within the list of emergency airports, the controller 120 may select a more distant runway as the appropriate emergency landing runway.

The non-pilot commands 124 may include an information dialog 322, a maneuver command 324, a configuration command 326, and a communication command 328. Each of the non-pilot commands 124 may be presented to the non-pilot in association with a graphic presentation 330 to aid the non-pilot in completing the command.

In addition, the processor 120 may present each of the non-pilot commands based on a hierarchy of commands based on safety of flight and the current aircraft status compared with the desired aircraft status. For example, a maneuver command 324 may take precedence over an information dialog 322. A turn left maneuver command 324 to keep the aircraft 102 on path may be critical to compared to a routing information dialog of distance remaining. Similarly, an attitude related maneuver command 324 (e.g., gently push) to keep the aircraft 102 from stalling may be more critical, thus higher on the hierarchy of commands or command hierarchy, than would a communication command 328 to change to a specific frequency.

In one embodiment of the inventive concepts disclosed herein, each of the information dialog 322, the maneuver command 324, the configuration command 326, and the communication command 328 may be configured for 1) interpretation by a non-pilot of the aircraft for a manual flight of the aircraft, 2) achieving the desired aircraft status to maintain aircraft control, and 3) assisting the non-pilot in maintaining the path to landing at the appropriate emergency landing runway. Once displayed, the controller 120 may further update each of the information dialog 322, the maneuver command 322, the configuration command 324, and the communication command 328 based on a change in the aircraft status.

The command hierarchy may follow a well-known flight rule of aviate, navigate, then communicate. Here, maneuver commands 324 may parallel the aviate phase of flight and thus remain at the top the command hierarchy.

Information Dialog

In embodiments, the information dialog 322 may include those informative messages offering awareness or assurance to the non-pilot. In some embodiments, a weather message or a situational update may aid the non-pilot in landing success.

Maneuver Command

In embodiments, the maneuver command 324 may include those aviation (e.g., three axis attitude) related commands to control roll, pitch and yaw. In embodiments, many non-pilots may not be capable of rudder use and therefore the controller 120 may limit commands to manipulate the rudders. Once exception may include brake pedal use upon landing to ensure the aircraft 102 is stopped on the prepared surface. Roll and pitch maneuver commands 324 may be of primary concern and at or near the top of the command hierarchy.

In some embodiments, the maneuver command 324 may include a stop command to discontinue the maneuver command 324 approaching the desired aircraft status. As the non-pilot is manually flying the aircraft 102, the non-pilot may be unaware of approach to the desired aircraft status. For example, as the maneuver command 324 may include a turn right as the aircraft approaches a desired heading associated with the desired aircraft status, the controller 120 may display a stop turn maneuver command 324 so the non-pilot may discontinue the turn.

In one embodiment of the inventive concepts disclosed herein, the maneuver command 324 may be presented with a graphic depiction of a desired flight control (e.g., yoke, stick, etc.), an animated graphic of the desired flight control (e.g., yoke turning left), and a direction of manipulation. In this manner the graphic and/or animated graphic may assist the non-pilot in selection of the correct flight control as well as the correct direction of manipulation.

Configuration Command

In embodiments, the configuration command 326 may include those changes in aircraft 102 configuration to enable the aircraft 102 to safely land. Wheels, flaps power trim may be exemplary types of configuration commands 326 presented with an associated graphic presentation 330 (animated or stationary) to enable the non-pilot to complete the configuration command 326.

In one embodiment of the inventive concepts disclosed herein, the configuration command may include a command to manipulate a landing gear position, a flap position, a trim position, a power setting, an engine control (e.g., mixture, propeller), and a speed brake position. Also, the configuration command 326 may further include an aircraft specific visual presentation of the control surface manipulation, an animated presentation of the aircraft specific visual presentation, and a direction of manipulation of the control surface.

Communication Command

In embodiments, the communication command 328 may include those changes in radio frequency to enable the non-pilot to safely communicate with ATC as well as additional entities external to the aircraft 102 including other aircraft within range able to assist. In addition, the communication command 328 may display results of the controller 120 accessing a weather condition at each airport in determining the appropriate emergency landing runway based on weather. The weather condition may be stored within the memory 122 at aircraft power up as well as updated during flight based on a controller 120 initiated transmission and reception via the communication link 140 to determine a current weather status at each of the probable emergency landing airports.

In one embodiment of the inventive concepts disclosed herein, the communication command may include a position-based frequency (e.g., ATC frequency based on position), a touchscreen command to change a set frequency, and an aircraft specific visual presentation of the communication control head and a method of use to ensure a visual representation of the specific aircraft equipment is presented to the non-pilot.

Figure 5:
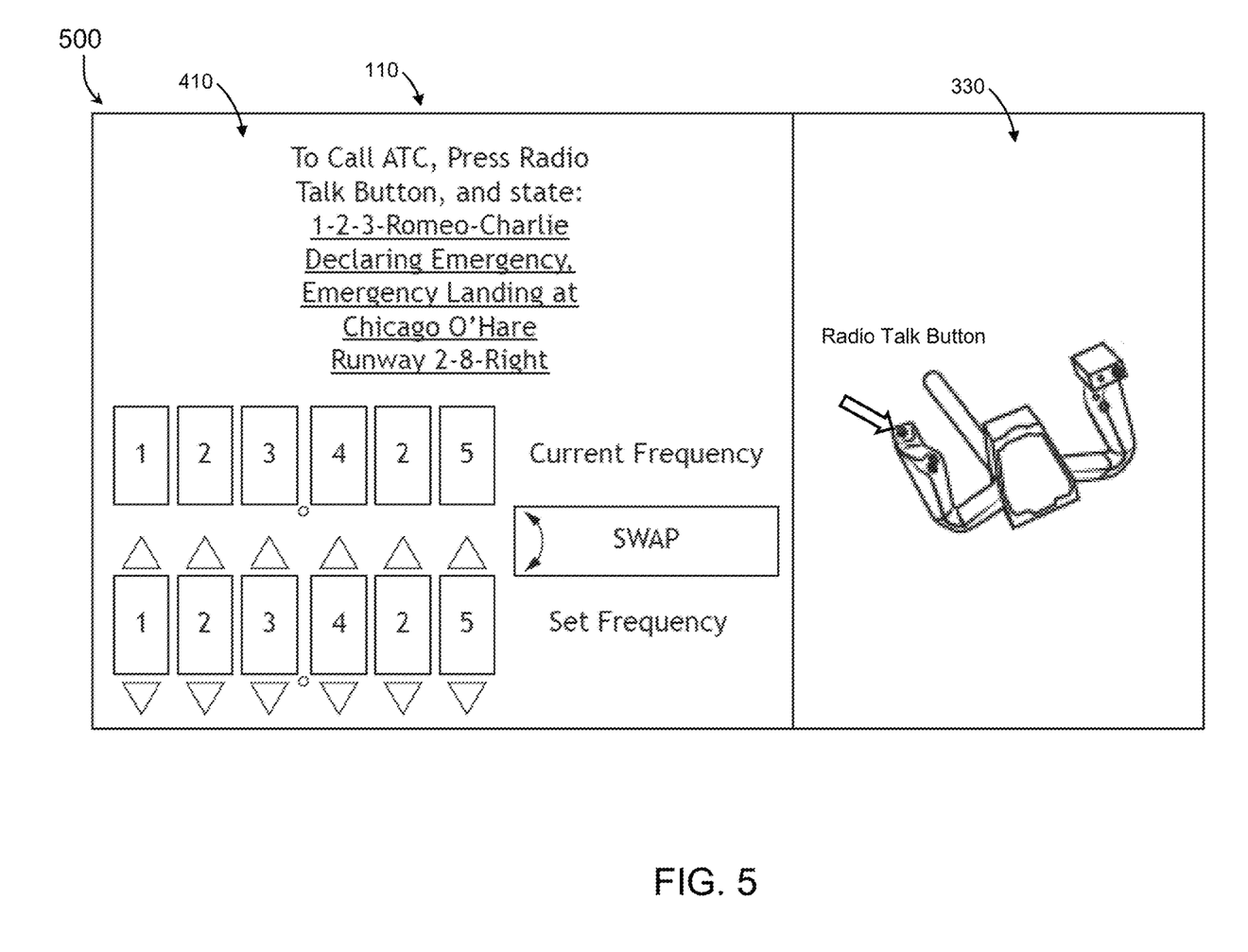
FIG. 5 is a diagram of a frequency communication command presentation in accordance with one embodiment of the inventive concepts disclosed herein.

FIG. 5 Frequency

Referring now to FIG. 5, a diagram of a frequency communication command presentation in accordance with one embodiment of the inventive concepts disclosed herein is shown. a frequency presentation 500 may include a touchscreen presentation within the multi-function display 410 to enable the non-pilot to successfully change frequencies. In one embodiment, the communication command 328 may include a graphic of the radio face within the graphic presentation 330 and directions on how to set a "set frequency" and then how to input the set frequency to the active frequency.

Figure 6:
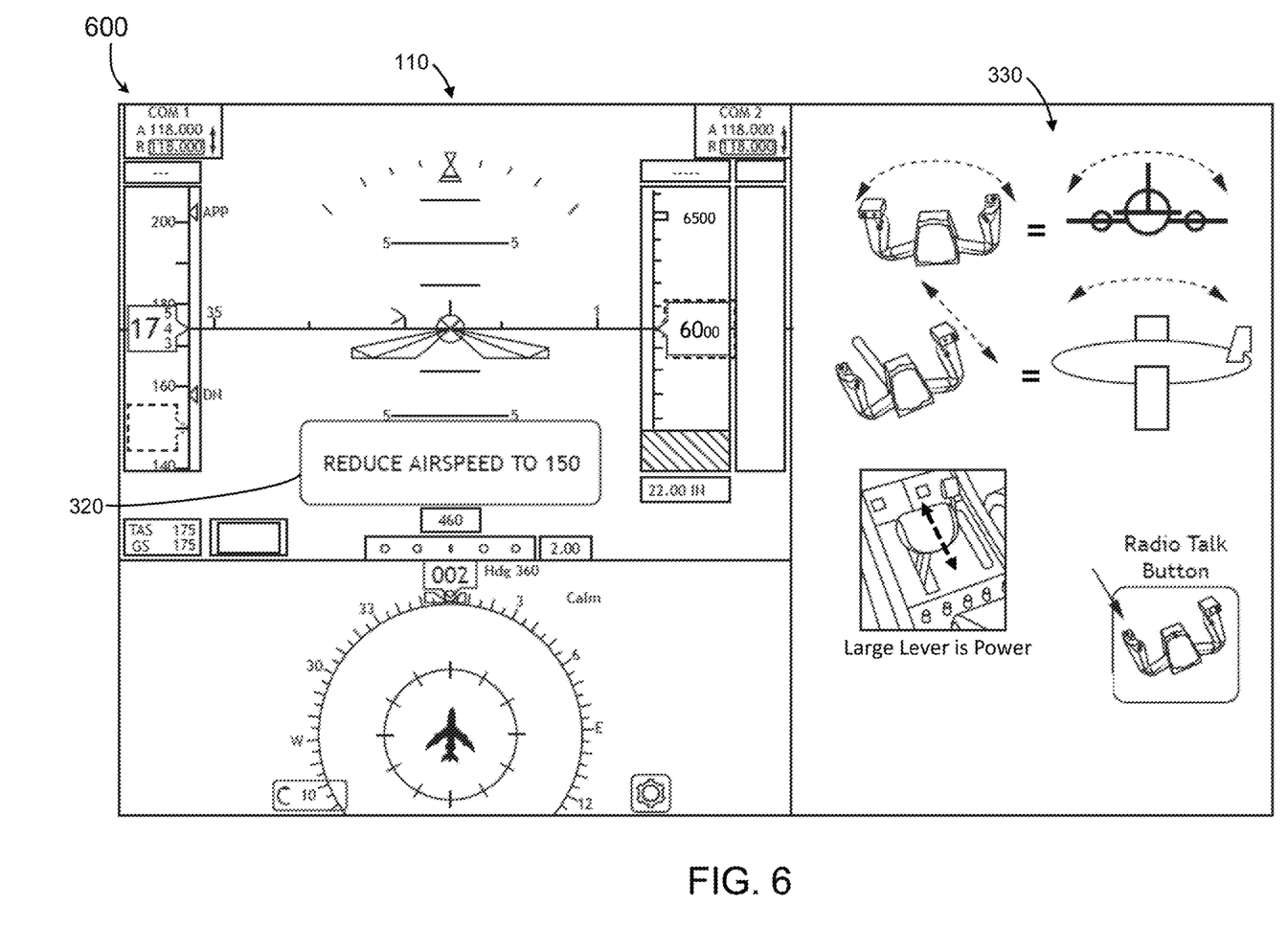
FIG. 6 is a diagram of an exemplary airspeed maneuver command presentation in accordance with one embodiment of the inventive concepts disclosed herein.

FIG. 6 Airspeed

Referring now to FIG. 6, a diagram of an exemplary airspeed maneuver command presentation in accordance with one embodiment of the inventive concepts disclosed herein is shown. An EFD airspeed change 600 diagram may indicate one maneuver command 324 to reduce airspeed to an exemplary 150 knots (kts). As above, the controller 120 may present each maneuver command 324 with an associated graphic presentation 330 of which lever to manipulate and alternatively an animated graphic of the power lever moving aft. Then, once the airspeed has reached the desired aircraft status of 150 kts, the controller 120 may present a similar graphic presentation 330 of advancing the power lever to maintain the airspeed.

The presentation graphic 330 may further indicate a teaching pattern to aid and inform the non-pilot of which result may arise from which control manipulation. For example, the presentation graphic 330 may display a yoke rotating back and forth while simultaneously presenting an aircraft with wings rolling back and forth. In this manner, a teaching presentation may help the non-pilot understand which control to manipulate to achieve a desired aircraft status.

Figure 7:
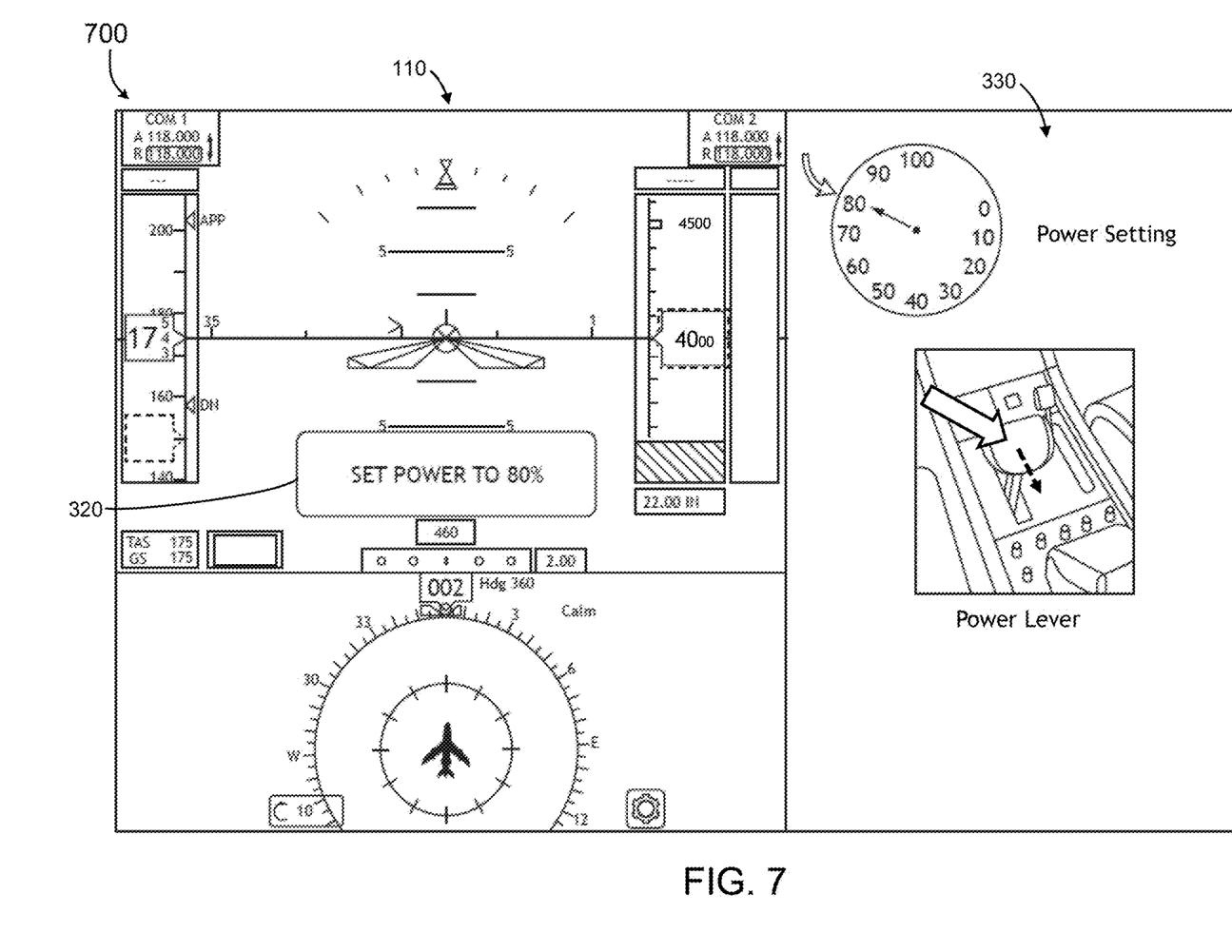
FIG. 7 a diagram of a power configuration command associated with one embodiment of the inventive concepts disclosed herein.

FIG. 7 Power

Referring now to FIG. 7, a diagram of a power configuration command associated with one embodiment of the inventive concepts disclosed herein is shown. An EFD power change diagram 700 may indicate the controller 120 displaying a configuration command 326 of a power change to 80% and an associated graphic presentation 330 indicating the power lever movement and a graphic presentation of a power indicator to mimic the actual power indicator within the flight deck.

Figure 8:
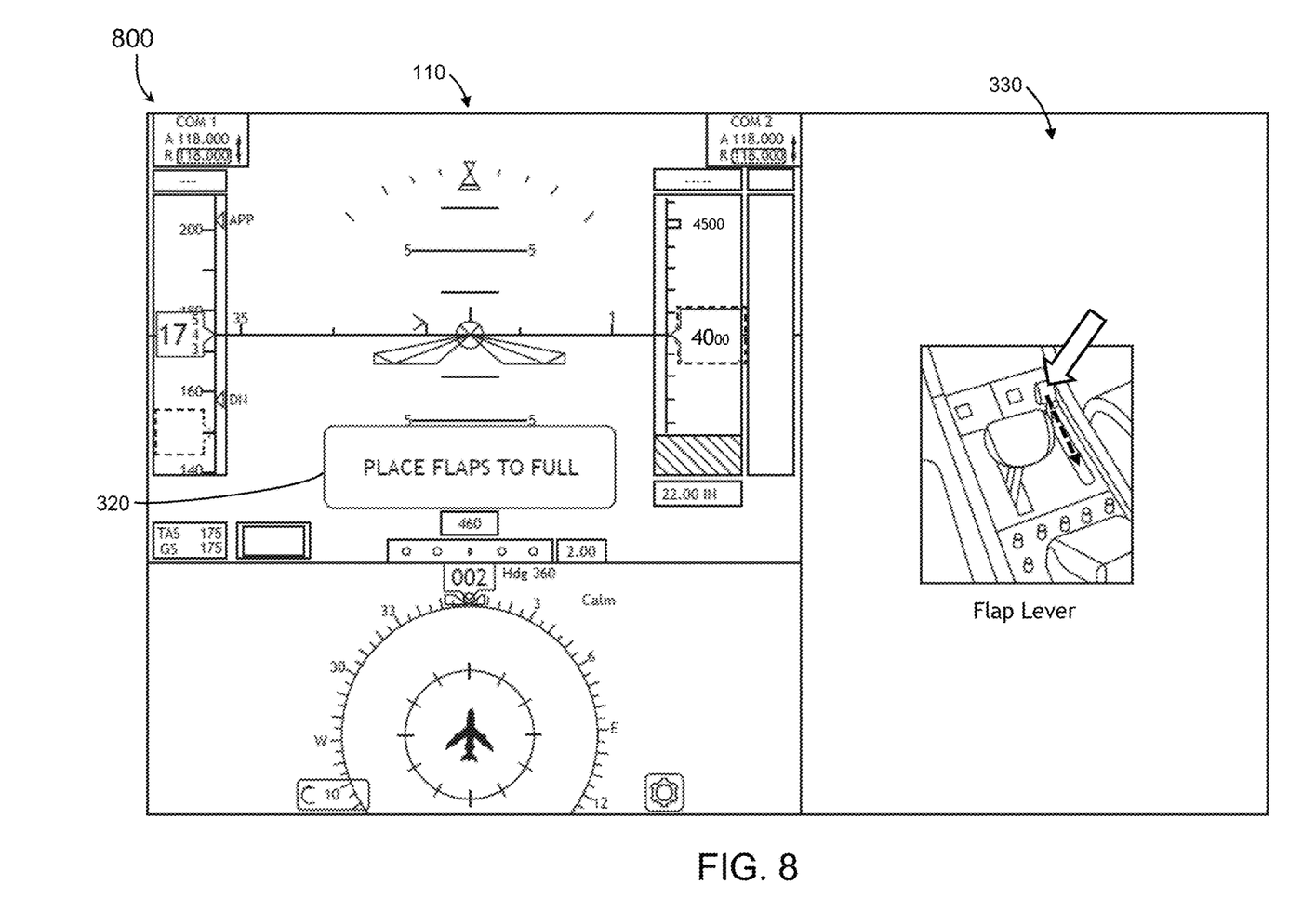
FIG. 8 is a diagram of a flaps configuration command exemplary of one embodiment of the inventive concepts disclosed herein.

FIG. 8 Flaps

Referring now to FIG. 8, a diagram of a flaps configuration command exemplary of one embodiment of the inventive concepts disclosed herein is shown. An EFD flaps change diagram 800 may similarly indicate one display the controller 120 may present to the non-pilot. Here, in the approach phase 206, the controller 120 may present the configuration command 326 of the text message to place the flaps to full and the associated graphic presentation 330 picturing the flap handle and the commanded movement.

Figure 9:
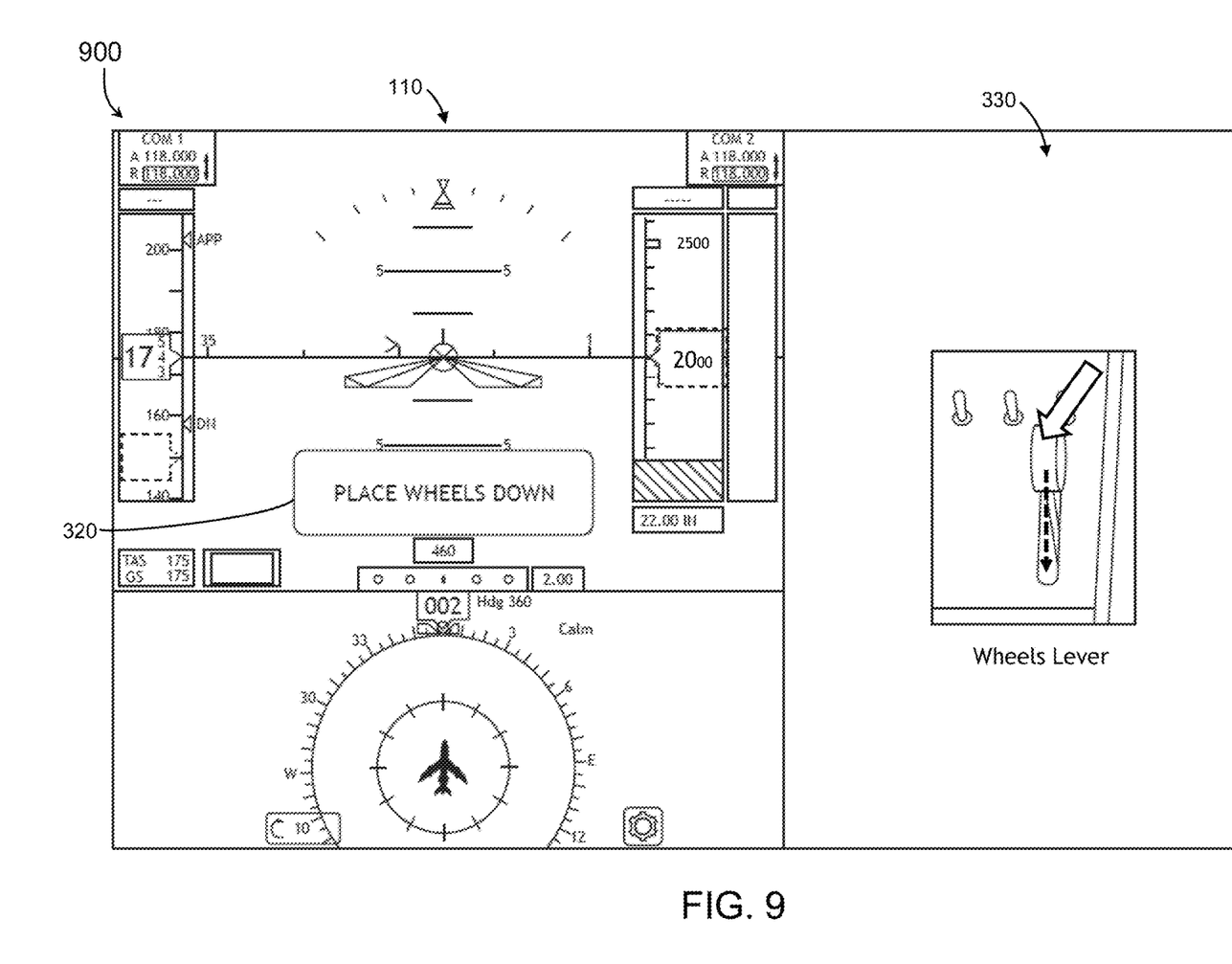
FIG. 9 is a graph of wheels configuration command exemplary of one embodiment of the inventive concepts disclosed herein.

FIG. 9 Wheels

Referring now to FIG. 9, a graph of wheels configuration command exemplary of one embodiment of the inventive concepts disclosed herein is shown. An EFD wheels change diagram 900 may similarly indicate one display the controller 120 may present to the non-pilot. Here, in the landing phase 208, the controller 120 may present the configuration command 326 of the text message to place the wheels down and the associated graphic presentation 330 picturing the wheels handle and the commanded movement to the down position.

Figure 10:
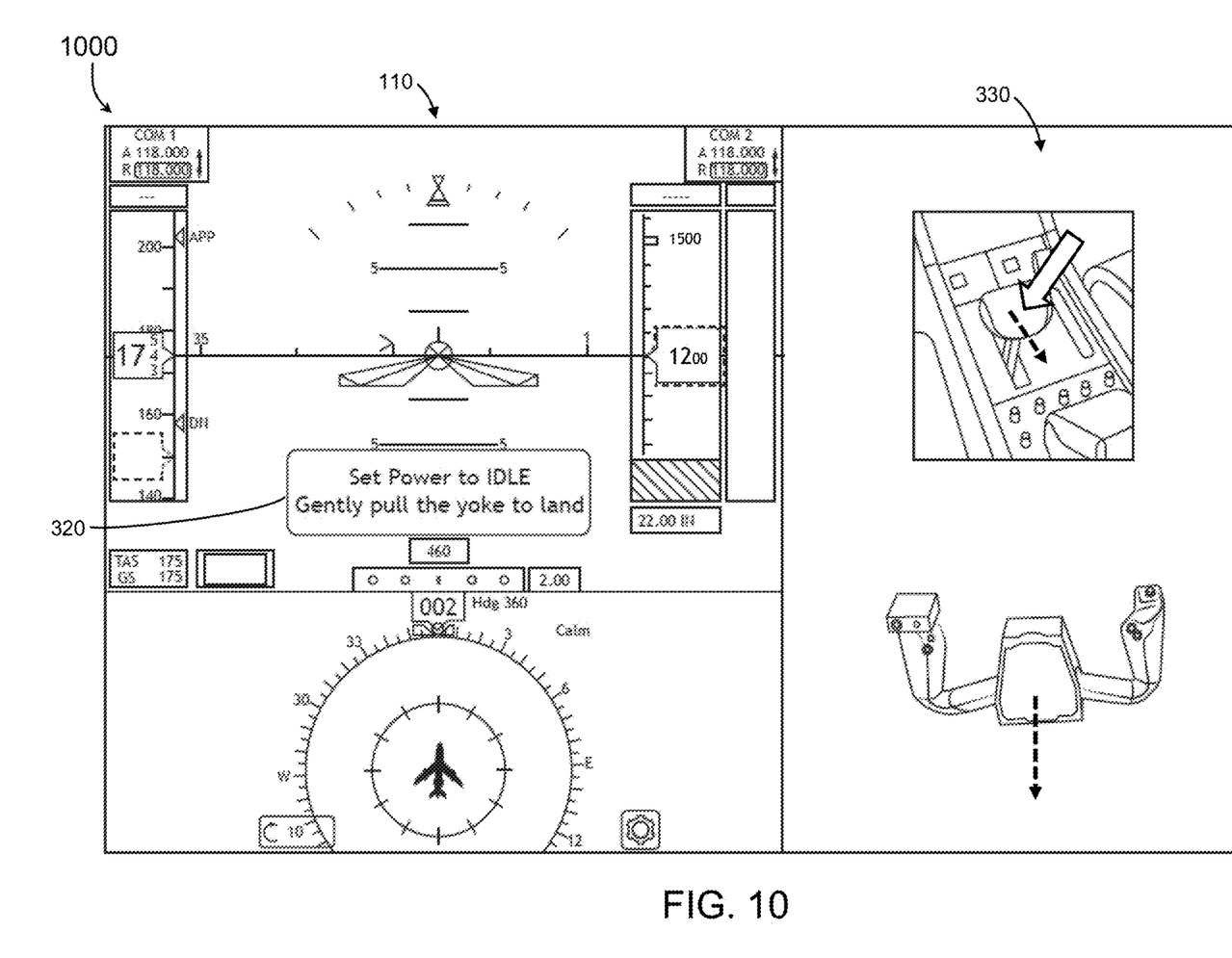
FIG. 10 is a diagram of landing maneuver command associated with one embodiment of the inventive concepts disclosed herein.

FIG. 10 Landing

Referring now to FIG. 10, a diagram of landing maneuver command associated with one embodiment of the inventive concepts disclosed herein is shown. An EFD landing command diagram 1000 may indicate the controller 120 simultaneously presenting the non-pilot with each of a maneuver command 324 and a configuration command 326. Here, the challenging maneuver of landing the aircraft 102 may be aided by the controller 120 commanding an airspeed higher than normal to decrease a stall potential during landing. As the controller 120 may have determined the appropriate emergency landing runway 220 based on a runway length significantly greater than required, an excess airspeed may allow the controller 120 to present the configuration command 326 of a power reduction first and then the maneuver command 324 of an aft displacement of the yoke after the power is at idle.

Figure 11:
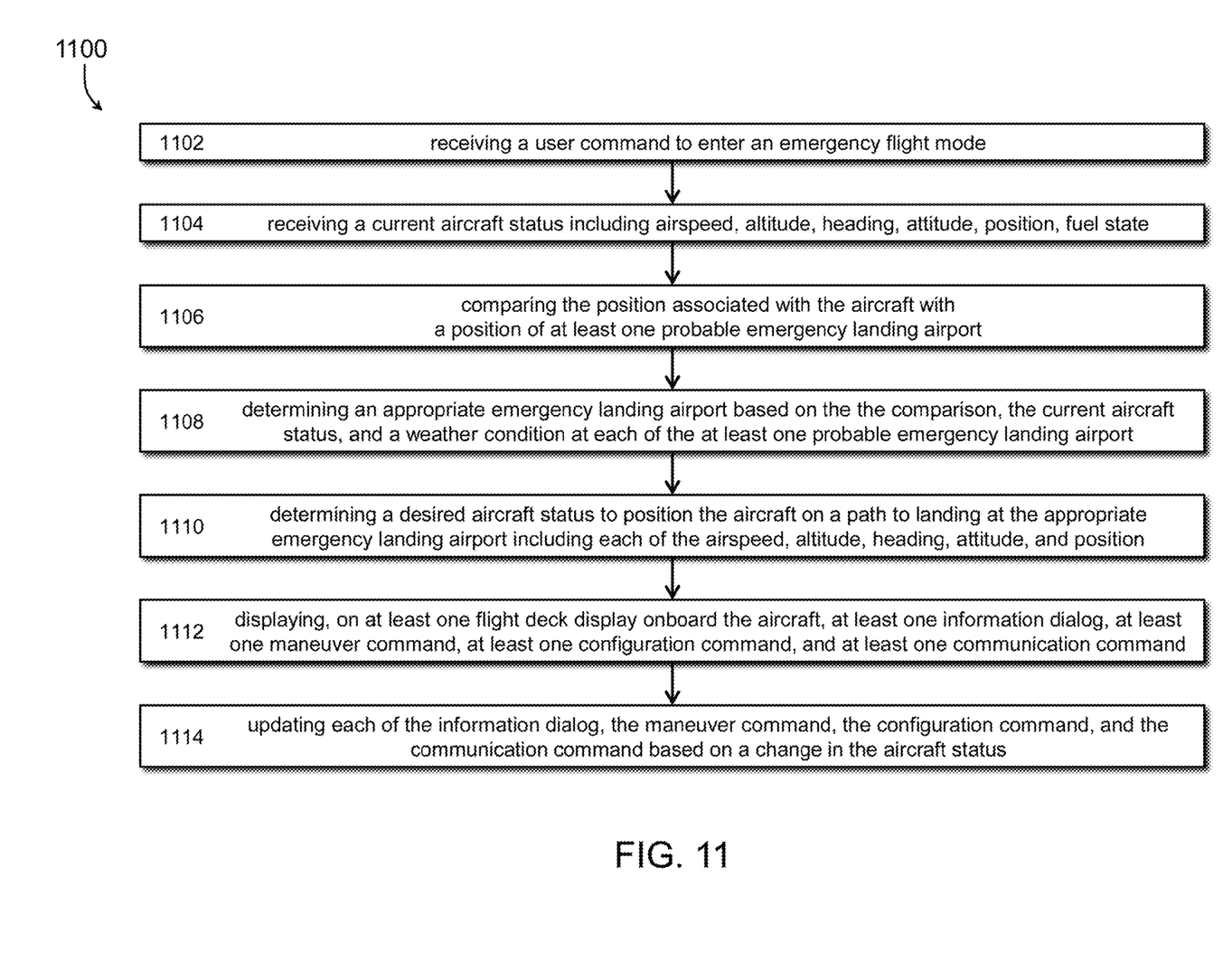
FIG. 11 is a diagram of a method for emergency flight direction in accordance with one embodiment of the inventive concepts disclosed herein.

FIG. 11 Method

Referring now to FIG. 11, a diagram of a method for emergency flight direction in accordance with one embodiment of the inventive concepts disclosed herein is shown. An EFD method flow 1100 may include, at a step 1102, receiving, from a flight deck interface onboard an aircraft, an indication of a user command to enter an emergency flight mode, and, at a step 1104, receiving a current aircraft status from an aircraft status link, the current aircraft status including at least an airspeed, an altitude, a heading, an attitude, a position, and a fuel state associated with the aircraft.

A step 1106 may include comparing the position associated with the aircraft with a position of at least one probable emergency landing airport while a step 1108 may include determining an appropriate emergency landing runway based on the comparison, the current aircraft status, and a weather condition at each of the at least one probable emergency landing airport.

A step 1110 may include determining a desired aircraft status to position the aircraft on a path to landing at the appropriate emergency landing runway, the desired aircraft status including each of the airspeed, the altitude, the heading, the attitude, and the position associated with the aircraft and a step 1112 may include displaying, on at least one flight deck display onboard the aircraft, at least one information dialog, at least one maneuver command, at least one configuration command, and at least one communication command.

Here, each of the at least one information dialog, the at least one maneuver command, the at least one configuration command, and the at least one communication command configured for 1) interpretation by a non-pilot of the aircraft for a manual flight of the aircraft, 2) achieving the desired aircraft status, and 3) assisting the non-pilot in maintaining the path to landing at the appropriate emergency landing ai runway airport.

A step 1114 may include updating each of the maneuver command, the configuration command, and the communication command based on a change in the aircraft status.

CONCLUSION

As will be appreciated from the above description, embodiments of the inventive concepts disclosed herein may provide a novel solution to assisting a non-pilot in manual flight with no autopilot to safely land an aircraft.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for emergency manual flight direction to a non-pilot, comprising:
at least one flight deck display onboard an aircraft;
a flight deck interface onboard the aircraft;
an aircraft status link onboard the aircraft, the aircraft status link configured to communicate an aircraft status, the aircraft status including at least an airspeed, an altitude, a heading, an attitude, a position, and a fuel state associated with the aircraft;
an aircraft communication link onboard the aircraft, comprising at least an Automatic Dependent Surveillance Broadcast (ADS-B) system, a voice communication capability, and a data communications capability;
a controller onboard the aircraft;
a tangible, non-transitory memory onboard the aircraft configured to communicate with the controller, the tangible, non-transitory memory including a list of emergency airports, the tangible, non-transitory memory having instructions stored therein that, in response to execution by the controller, cause the controller to:
receive, from the flight deck interface, an indication of a user command to enter an emergency flight mode;
receive a current aircraft status from the aircraft status link;
determine at least one probable emergency landing airport based on the current aircraft status and the list of emergency airports;
determine an appropriate emergency landing runway based on the aircraft status and a weather condition at each of the at least one probable emergency landing airports;
determine a desired aircraft status to position the aircraft on a path to landing at the appropriate emergency landing runway;
display, on the at least one flight deck display, at least one information dialog, at least one maneuver command, at least one configuration command, and at least one communication command;
identify nearby aircraft and corresponding settings to enable voice communication with those nearby aircraft;
each of the at least one information dialog, the at least one maneuver command, the at least one configuration command, and the at least one communication command configured for 1) interpretation by a non-pilot of the aircraft for a manual flight of the aircraft, 2) achieving the desired aircraft status, and 3) assisting the non-pilot in maintaining the path to landing at the appropriate emergency landing runway, the at least one maneuver command includes each of a graphic depiction of a desired flight deck flight control, an animated graphic of the desired flight deck flight control, a teaching pattern to visually indicate to the non-pilot how the aircraft status is altered by a specific control manipulation, and a direction of manipulation of the flight deck flight control; and
update each of the at least one information dialog, the at least one maneuver command, the at least one configuration command, and the at least one communication command based on a change in the aircraft status,
wherein:
the at least one maneuver command, the at least one configuration command, and the at least one communication command configured for sequential, non-simultaneous execution to facilitate safe implementation by the non-pilot;
the at least one maneuver command is limited to exclude rudder manipulation;
the communication command includes changes to a radio frequency to enable communication with the nearby aircraft; and the at least one information dialog includes a diagram of a frequency communication command presentation to enable the non-pilot to successfully change frequencies.

2. The system for emergency manual flight direction to a non-pilot of claim 1, further including an aircraft navigation link configured for supplying the controller with a navigation solution.

3. The system for emergency manual flight direction to a non-pilot of claim 2, wherein the desired aircraft status includes the navigation solution.

4. The system for emergency manual flight direction to a non-pilot of claim 1, wherein the desired aircraft status further comprises at least one of a speed, an altitude, a three-axis attitude, and a heading.

5. The system for emergency manual flight direction to a non-pilot of claim 1, wherein the flight deck interface further comprises one of a guarded switch, at least one touchscreen presentation, and a dedicated button, and further includes a sequence of user inputs to exit the emergency flight mode.

6. The system for emergency manual flight direction to a non-pilot of claim 1, wherein the at least one maneuver command further comprises a stop command to discontinue the maneuver command approaching the desired aircraft status.

7. The system for emergency manual flight direction to a non-pilot of claim 1, wherein the at least one flight deck display further comprises one of a primary flight display and a multi-function display.

8. The system for emergency manual flight direction to a non-pilot of claim 1, wherein the weather condition is one of: 1) stored within the memory at aircraft power up and 2) updated based on a transmission and reception via the communication link to determine a current weather status at each of the at least one probable emergency landing airports.

9. The system for emergency manual flight direction to a non-pilot of claim 1, wherein the at least one configuration command further comprises a command to manipulate at least one of a landing gear position, a flap position, a trim position, a power setting, and a speed brake position.

10. The system for emergency manual flight direction to a non-pilot of claim 1, wherein the at least one configuration command further comprises an aircraft specific visual presentation of the control surface manipulation, an animated presentation of the aircraft specific visual presentation, and a direction of manipulation.

11. The system for emergency manual flight direction to a non-pilot of claim 1, wherein the at least one communication command further comprises a position based frequency, a touchscreen command, and an aircraft specific visual presentation of the communication control and a method of use.

12. A method for emergency manual flight direction to a non-pilot, comprising:
  receiving, from a flight deck interface onboard an aircraft, an indication of a user command to enter an emergency flight mode;
  receiving a current aircraft status from an aircraft status link, the current aircraft status including at least an airspeed, an altitude, a heading, an attitude, a position, and a fuel state associated with the aircraft;
  comparing the position associated with the aircraft with a position of at least one probable emergency landing airport;
  determining an appropriate emergency landing runway based on the comparison, the current aircraft status, and a weather condition at each of the at least one probable emergency landing airport;
  determining a desired aircraft status to position the aircraft on a path to landing at the appropriate emergency landing runway, the desired aircraft status including each of the airspeed, the altitude, the heading, the attitude, and the position associated with the aircraft;
  displaying, on at least one flight deck display onboard the aircraft, at least one information dialog, at least one maneuver command, at least one configuration command, and at least one communication command;
  identifying nearby aircraft and corresponding settings to enable voice communication with those nearby aircraft;
  each of the at least one information dialog, the at least one maneuver command, the at least one configuration command, and the at least one communication command configured for 1) interpretation by a non-pilot of the aircraft for a manual flight of the aircraft, 2) achieving the desired aircraft status, and 3) assisting the non-pilot in maintaining the path to landing at the appropriate emergency landing runway airport, the at least one maneuver command includes each of a graphic depiction of a desired flight deck flight control, a teaching pattern to visually indicate to the non-pilot how the aircraft status is altered by a specific control manipulation, an animated graphic of the desired flight deck flight control, and a direction of manipulation of the desired flight deck flight control; and
  updating each of the maneuver command, the configuration command, and the communication command based on a change in the aircraft status,
  wherein:
    the at least one maneuver command, the at least one configuration command, and the at least one communication command configured for sequential, non-simultaneous execution to facilitate safe implementation by the non-pilot;
    the at least one maneuver command is limited to exclude rudder manipulation;
    the communication command includes changes to a radio frequency to enable communication with the nearby aircraft; and
    the at least one information dialog includes a diagram of a frequency communication command presentation to enable the non-pilot to successfully change frequencies.

13. The method for emergency manual flight direction to a non-pilot of claim 12, wherein displaying the at least one maneuver command, the at least one configuration command, and the at least one communication command further comprises a hierarchy of commands based on a safety of flight and the current aircraft status compared with a desired aircraft status.

* * * * *